(12) United States Patent
van Ijzendoorn

(10) Patent No.: US 11,809,844 B2
(45) Date of Patent: Nov. 7, 2023

(54) CREATING AN APP METHOD AND SYSTEM

(71) Applicant: Mendix Technology B.V., Rotterdam (NL)

(72) Inventor: Arjan van Ijzendoorn, Utrecht (NL)

(73) Assignee: MENDIX TECHNOLOGY B.V., Rotterdam (NL)

( * ) Notice: Subject to any disclaimer, the term of this patent is extended or adjusted under 35 U.S.C. 154(b) by 0 days.

(21) Appl. No.: 17/348,742

(22) Filed: Jun. 15, 2021

(65) Prior Publication Data

US 2021/0389933 A1    Dec. 16, 2021

(30) Foreign Application Priority Data

Jun. 16, 2020 (EP) ..................... 20180268

(51) Int. Cl.
*G06F 8/36* (2018.01)

(52) U.S. Cl.
CPC ..................... *G06F 8/36* (2013.01)

(58) Field of Classification Search
None
See application file for complete search history.

(56) References Cited

U.S. PATENT DOCUMENTS

| | | | | |
|---|---|---|---|---|
| 8,453,112 | B1 * | 5/2013 | Brambley | G06F 8/71 717/113 |
| 8,516,434 | B2 * | 8/2013 | McPeak | G06F 8/36 717/100 |
| 9,430,229 | B1 * | 8/2016 | Van Zijst | G06F 9/3844 |
| 10,915,316 | B1 * | 2/2021 | Turner | G06F 9/3844 |
| 2006/0225040 | A1 * | 10/2006 | Waddington | G06F 8/71 717/122 |

(Continued)

FOREIGN PATENT DOCUMENTS

WO    2019236519 A1    12/2019

OTHER PUBLICATIONS

Mens, "A State-of-the-Art Survey on Software Merging", 2002, IEEE (Year: 2002).*

(Continued)

*Primary Examiner* — Hossain M Morshed
(74) *Attorney, Agent, or Firm* — LEMPIA SUMMERFIELD KATZ LLC

(57) ABSTRACT

A computer-implemented method of creating an app includes providing an app development source artifact, providing a first changed artifact and a second changed artifact differing from the app development source artifact in first differences and in second differences, respectively. The app development source artifact, the first changed artifact, and the second changed artifact include information objects to which a unique identifier is assigned, respectively. The first differences and the second differences are determined. The method includes determining if the first differences and the second differences are mergeable taking the respective unique identifier of the respective information objects into account. If the first differences and the second differences are mergeable, the method includes merging the first differences and the second differences with the app development source artifact, and developing the app by using the merged app development source artifact.

19 Claims, 6 Drawing Sheets

(56) References Cited

U.S. PATENT DOCUMENTS

2019/0377558 A1* 12/2019 Bach .................... G06F 8/71
2021/0389933 A1* 12/2021 van Ijzendoorn ........ G06F 8/36

OTHER PUBLICATIONS

Edwards, "Flexible Conflict Detection and Management In Collaborative Applications", 1997, ACM (Year: 1997).*
European Search Report for European Application No. 20180268.3-1224 dated Dec. 1, 2020.
Mens, Tom. "A state-of-the-art survey on software merging." IEEE transactions on software engineering 28.5 (2002): 449-162.

* cited by examiner

CREATING AN APP METHOD AND SYSTEM

This application claims the benefit of European Patent Application No. EP 20180268.3, filed on Jun. 16, 2020, which is hereby incorporated by reference in its entirety.

TECHNICAL FIELD

The present disclosure is directed, in general, to software management systems (e.g., systems for developing apps) that may be used to manage, build, test, deploy, and iterate such apps (collectively referred to herein as product systems).

BACKGROUND

Recently, an increasing number of computer software products are used both for personal needs and for business needs in the form of applications (throughout the present patent document, simply referred to as "apps"). Such apps may be used in a mobile context as well as on cloud computing platforms and "on premise" and may provide a specific set of functions. The present embodiments generally relate to the development and the creation of such apps.

Currently, there exist product systems and solutions that support app development. Such product systems may benefit from improvements.

SUMMARY AND DESCRIPTION

Variously disclosed embodiments include methods and computer systems that may be used to facilitate creating an app.

According to a first aspect of the present embodiments, a computer-implemented method of creating an app may include: providing an app development source artifact; and providing a first changed artifact and a second changed artifact differing from the app development source artifact in first differences and in second differences, respectively. The app development source artifact, the first changed artifact, and the second changed artifact include information objects to which a unique identifier is assigned, respectively. The computer implemented method also includes determining the first differences and the second differences, respectively; determining if the first differences and the second differences are mergeable taking the respective unique identifier of the respective information objects into account; and if the first differences and the second differences are mergeable, merging the first differences and the second differences with the app development source artifact, and developing the app by using the merged app development source artifact.

According to a second aspect of the present embodiments, a computer system may be arranged and configured to execute the acts of this computer-implemented method of creating an app. For example, the described computer system may be arranged and configured to execute the following acts: providing an app development source artifact; providing a first changed artifact and a second changed artifact differing from the app development source artifact in first differences and in second differences, respectively, where the app development source artifact, the first changed artifact, and the second changed artifact include information objects to which a unique identifier is assigned, respectively; determining the first differences and the second differences, respectively; determining if the first differences and the second differences are mergeable taking the respective unique identifier of the respective information objects into account; and if the first differences and the second differences are mergeable, merging the first differences and the second differences with the app development source artifact; and developing the app by using the merged app development source artifact.

According to a third aspect of the present embodiments, a computer-readable medium may be encoded with executable instructions that, when executed, cause the described computer system to carry out the described method of creating an app. By way of example, the described computer-readable medium may be non-transitory and may further be a software component on a storage device.

The foregoing has outlined rather broadly the technical features of the present disclosure so that those skilled in the art may better understand the detailed description that follows. Additional features and advantages of the disclosure will be described hereinafter. Those skilled in the art will appreciate that the conception and the specific embodiments disclosed may be used as a basis for modifying or designing other structures for carrying out the same purposes of the present disclosure. Those skilled in the art will also realize that such equivalent constructions do not depart from the spirit and scope of the disclosure in its broadest form.

Various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

DETAILED DESCRIPTION

Figure 1:
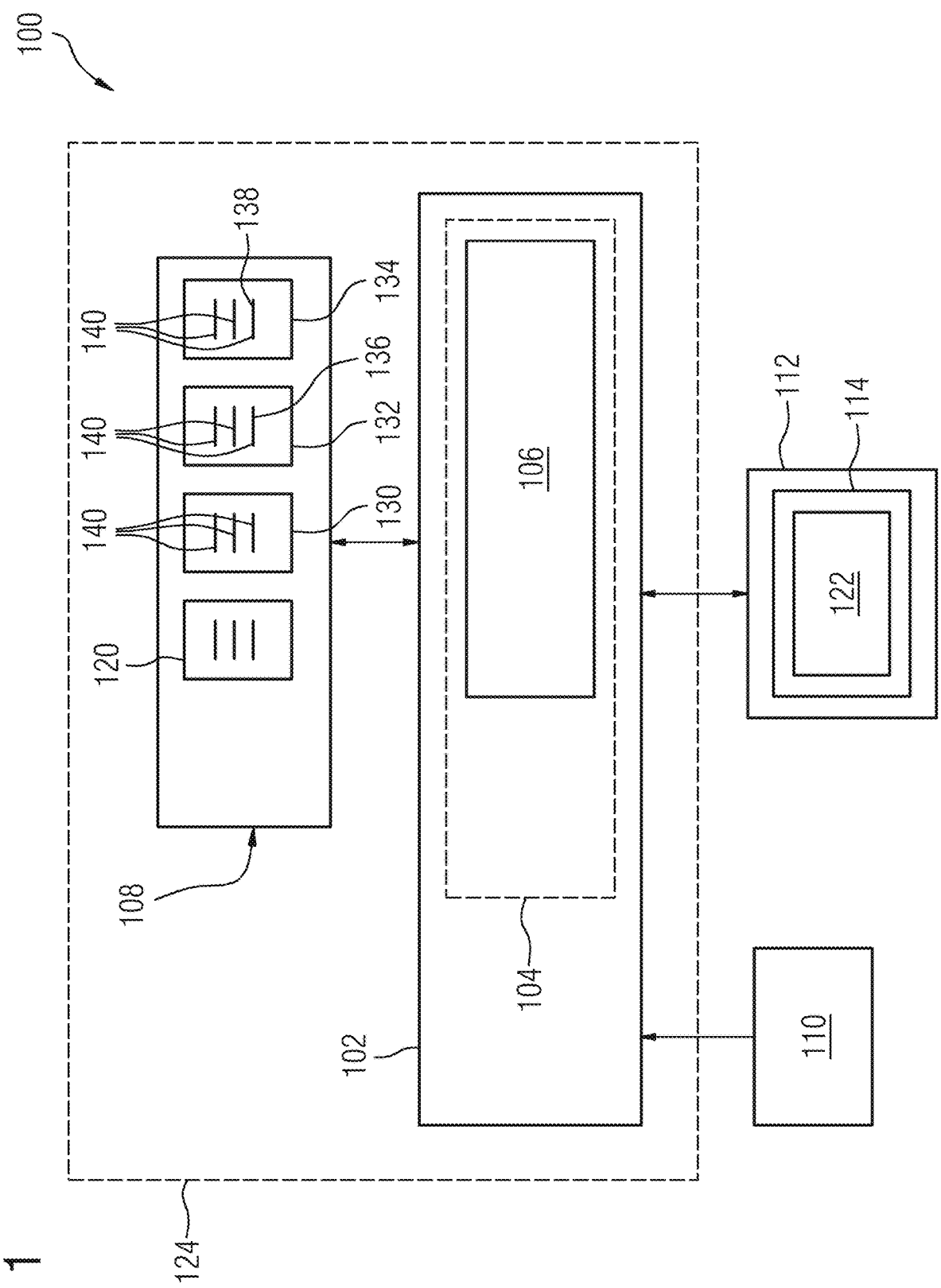
FIG. 1 illustrates a functional block diagram of an example system that facilitates creating an app in a product system.

Various technologies that pertain to systems and methods for creating an app in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for example, an element may be configured to perform functionality that is described as being carried out by multiple elements. The numerous innovative teachings of the present patent document will be described with reference to exemplary non-limiting embodiments.

An app generally refers to a software program that, on execution, performs specific desired tasks. In general, a number of apps are executed in a runtime environment containing one or more operating systems ("OSs"), virtual machines (e.g., supporting Java™ programming language), device drivers, etc.

Apps may be created, edited, and represented using traditional source code. Examples of such traditional source code include C, C++, Java, Flash, Python, Perl, and other script-based methods of representing an app. Developing, creating, and managing such script-based apps or parts of such script-based apps may be accomplished by manual coding of suitably trained users.

Developers often use Application Development Frameworks ("ADFs") (e.g., which are by themselves applications or apps) for implementing/developing desired apps. An ADF provides a set of pre-defined code/data modules that may be directly/indirectly used in the development of an app. An ADF may also provide tools such as an Integrated Development Environment ("IDE"), code generators, debuggers, etc., which facilitate a developer in coding/implementing the desired logic of the app in a faster/simpler manner.

In general, an ADF simplifies app development by providing reusable components that may be used by app developers to define user interfaces ("UIs") and app logic by, for example, selecting components to perform desired tasks and defining the appearance, behavior, and interactions of the selected components. Some ADFs are based on a model-view-controller design pattern that promotes loose coupling and easier app development and maintenance.

According to another approach, apps may also be created, edited, and represented using visual model-based representations. Unlike traditional source code implementations, such apps may be created, edited, and/or represented by drawing, moving, connecting, and/or disconnecting visual depictions of logical elements within a visual modeling environment. Visual model-based representations of apps may use symbols, shapes, lines, colors, shades, animations, and/or other visual elements to represent logic, data or memory structures or user interface elements. In order to program a traditional script-based app, programmers are typically required to type out detailed scripts according to a complicated set of programming syntax rules. In contrast, programming a visual model-based app may, in some cases, be done by connecting various logical elements (e.g., action blocks and/or decision blocks) to create a visual flow chart that defines the operation of the app. Similarly, defining data structures (e.g., variable types, database objects, or classes) and/or user interface elements (e.g., dropdown boxes, lists, text input boxes) in a visual model-based app may be done by drawing, placing, or connecting visual depictions of logical elements within a virtual workspace, as opposed to typing out detailed commands in a script. Visual-model based apps may therefore be more intuitive to program and/or edit compared to traditional script-based apps.

For brevity, references to a "model," a "visual model," or an "application" or "app" may refer to visual model-based apps unless specifically indicated. In some cases, such visual model-based apps may represent complete, stand-alone apps for execution on a computer system. Visual model-based apps may also represent discrete modules that are configured to perform certain tasks or functions, but do not represent complete apps; instead, such discrete modules may be inserted into a larger app or combined with other discrete modules to perform more complicated tasks. Examples of such discrete modules may include modules for validating a ZIP code, for receiving information regarding current weather from a weather feed, and/or for rendering graphics.

Visual models may be represented in two forms: an internal representation and one or more associated visual representations. The internal representation may be a file encoded according to a file format used by a modeling environment to capture and define the operation of an app (or part of an app). For example, the internal representation may define what inputs an app may receive, what outputs an app may provide, the algorithms and operations by which the app may arrive at results, what data the app may display, what data the app may store, etc. The internal representation may also be used to instruct an execution environment how to execute the logic of the app during runtime. Internal representations may be stored in the form of non-human-readable code (e.g., binary code). Internal representations may also be stored according to a binary stored java script object notation (JSON) format, and/or an XML format. At run-time, an execution engine may use an internal representation to compile and/or generate executable machine code that, when executed by a processor, causes the processor to implement the functionality of the model.

The internal representation may be associated with one or more visual representations. Visual representations may include visual elements that depict how an app's logic flows, but which are not configured to be compiled or executed. These visual representations may include, for example, flow-charts or decision trees that show a user how the app will operate. The visual models may also visually depict data that is to be received from the user, data that is to be stored, and data that is to be displayed to the user. These visual models may also be interactive, which allows a user to manipulate the model in an intuitive way. For example, visual representations may be configured to display a certain level of detail (e.g., number of branches, number of displayed parameters, granularity of displayed logic) by default. However, users may interact with the visual representation in order to show a desired level of detail; for example, users may display or hide branches of logic, and/or display or hide sets of parameters. Details relating to an element of the visual model may be hidden from view by default but may appear in a sliding window or pop-up that appears on-screen when the user clicks on the appropriate element. Users may also zoom in or out of the model, and/or pan across different parts of the model, to examine different parts of the model. Users may also copy or paste branches of logic from one section of the model into another section, or copy/paste branches of logic from a first model into a second model. In some cases, parts of the model may contain links to other parts of the model, such that if a user clicks on a link, the user will automatically be led to another part of the model. A viewing user may interact with a visual representation in at least some of the same ways that the viewing user might interact with the model if it were displayed within a modeling environment. In other words, the visual representation may be configured to mimic how the model would appear if it were displayed within a visual modeling environment. A single internal representation may correspond to multiple visual representations that use different styles or formatting rules to display app logic. For example, multiple visual representations corresponding to the same internal representation may differ from one another in their use of color, elements that are included or omitted, and use of symbols, shapes, lines, colors, and/or shades to depict logic flow.

With reference to FIG. 1, a functional block diagram of an example computer system or data processing system 100 that facilitates creating an app 120 is illustrated. The processing system 100 may include an app development platform 124 including at least one processor 102 that is configured to execute at least one application software component 106 from a memory 104 accessed by the processor 102. The application software component 106 may be configured (e.g., programmed) to cause the processor 102 to carry out various acts and functions described herein. For example, the described application software component 106 may include and/or correspond to one or more components of an app development application that is configured to generate and store product data in a data store 108 such as a database. Further, the described application software component 106 may include and/or correspond to one or more components of an app creation or development application.

By way of example, the app development platform 124 may be cloud-based, internet-based, and/or be operated by a provider providing app development and creation support, including, for example, supporting low-code and/or visual model-based app development. The user may be located close to the app development platform 124 or remote (e.g., anywhere else, such as using a mobile device for connecting to the app development platform 124, such as via the internet). The mobile device may include an input device 110 and a display device 112. In some examples, the app development platform 124 may be installed and run on a device of the user, such as a computer, laptop, pad, on-premise computing facility, or the like.

Examples of product systems that may be adapted to include the app creation and/or development features described herein may include the low-code software platform of Mendix Inc., of Boston, Mass., USA. This platform provides tools to build, test, deploy, iterate, develop, create and manage apps and is based on visual, model-driven software development. The systems and methods described herein may, however, be used in other product systems (e.g., PLM, PDM, ALM systems) and/or any other type of system that generates and stores product data in a database. Also, examples of databases that may be used as one or more data stores described herein include database server applications such as Oracle, Microsoft SQL Server, or any other type of data store that is operative to store data records.

It may be difficult and time-consuming to create apps in complex app development and/or management environments. For example, advanced coding or software development or management knowledge of users may be required, or selections of many options need to be made consciously, both involving many manual steps, which is a long and not efficient process.

To enable the enhanced creation of apps 120, the described product system or processing system 100 may include at least one input device 110 and at least one display device 112 (e.g., a display screen). The described processor 102 may be configured to generate a GUI 114 through the display device 112. Such a GUI may include GUI elements such as buttons, links, search boxes, lists, text boxes, images, and scroll bars usable by a user to provide inputs through the input device 110 that cause creating an app 120. By way of example, the GUI may include an app development UI 122 provided to a user for developing the app 120.

In an example embodiment, the application software component 106 and/or the processor 102 may be configured to be provided with the app development source artifact 130. Further, the application software component 106 and/or the processor 102 may be configured to be provided with the first changed artifact 132 and the second changed artifact 134 differing from the app development source artifact 130 in first differences 136 and in second differences 138, respectively. The app development source artifact 130, the first changed artifact 132, and the second changed artifact 134 may include information objects 140 to which a unique identifier may be assigned, respectively. The application software component 106 and/or the processor 102 may be configured to determine the first differences 136 and the second differences 138, respectively. Further, the application software component 106 and/or the processor 102 may be configured to determine if the first differences 136 and the second differences 138 are mergeable taking the respective unique identifier of the respective information objects 140 into account. If the first differences 136 and the second differences 138 are mergeable, the application software component 106 and/or the processor 102 may be configured to merge the first differences 136 and the second differences 158 with the app development source artifact 130. The application software component 106 and/or the processor 102 may further be configured to develop the app 120 by using the merged app development source artifact 130'.

The app development source artifact 130, the first changed artifact 132, and the second changed artifact 134 may, by way of example, be provided by one or a number of users that make contributions to the development of the app 120. By way of example, app developers may start with a base version and make branches resulting in an app development source artifact 130 corresponding to the base version and in one or more first changed artifact 132 and second changed artifact 134 corresponding to the branches. The app developers may work independently of each other and then wish to merge their work with the work of other developers.

The app 120, the app development source artifact 130, the first changed artifact 132, and the second changed artifact 134 may be stored in the data store 108. In example embodiments, the app 120 may be stored in a different repository or data store than the app development source artifact 130, the first changed artifact 132, and the second changed artifact 134. Also, the first changed artifact 132, the second changed artifact 134, and/or the app development source artifact 130 may be stored in different repositories or data stores.

The first differences 136 and the second differences 138 may, by way of example, be such that, when comparing the app development source artifact 130 with the first changed artifact 132 and the second changed artifact 134, respectively, one or more information objects 140 are added, moved, or deleted, or such that one or more properties of one or more information objects 140 are changed. Also, the first differences 136 and the second differences 138 may, by way of example, be such that a pointer to another information object 140 has been created, changed, or deleted. Further, by way of example, the first differences 136 and the second differences 138 may respectively be such that only one amendment is made in the first changed artifact 132 and/or the second changed artifact 134, respectively. This one amendment may be, for example, one of the explained differences (e.g., adding, moving, or deleting one information object 140, creating, changing or deleting a pointer to another information object 140, or changing of one property of one information object 140). In example embodiments, the first differences 136 and the second differences 138 may respectively include two or more of such amendments. In these examples, the first differences 136 and the second differences 138 may be understood as a list of differences, respectively. When two sides (e.g., two developers) have made changes (e.g., resulting in a first changed artifact 132 and a second changed artifact 134), there may be conflicts, some of which may be resolved and/or merged according to the present approach.

The mentioned information objects 140 have a respective unique identifier so that the information objects 140 may be found and retrieved in the respective artifact (e.g., the app development source artifact 130, the first changed artifact 132 and the second changed artifact 134). The respective unique identifier may allow for finding and retrieving the respective information object 140 even if the respective information object 140 has been amended or moved. In some examples, the respective unique identifier may be unchanging, unchangeable, immutable, non-volatile, or any combination thereof. By way of example, the respective unique identifier may be unchanging, unchangeable, immutable, non-volatile, or any combination thereof during a number of acts or all acts of the presently suggested method. In further examples, the respective unique identifier may be unchanging, unchangeable, immutable, non-volatile, or any combination thereof as soon as the respective unique identifier has been assigned to a respective information object 140. The characteristics of the unique identifier imply that the unique identifier does not relate to a line number in which an information object 140 may (e.g., temporarily or currently) be located in an artifact (e.g., document) since the line number in which an information object 140 is located may quickly change (e.g., simply by adding other information objects 140 above this information object 140). Hence, the mentioned line number is not a unique identifier nor is the line number unchanging, unchangeable, immutable, or non-volatile.

By way of example, the information objects 140 concerned by the first differences 136 may be identified so that the corresponding unique identifiers of these information objects 140 are also identified. Also, the information objects 140 concerned by the second differences 138 may be identified so that the corresponding unique identifiers of these information objects 140 are also identified. In some examples, the identified unique identifiers are compared to the unique identifiers of the information objects 140 of the app development source artifact 130. Hence, the first differences 136 and the second differences 138 may be identified on the level of single information objects 140. The respective unique identifier may therefore facilitate and provide a reliable determination of the first differences 136 between the first changed artifact 132 and the app development source artifact 130, as well as a reliable determination of the second differences 138 between the second changed artifact 134 and the app development source artifact 130.

Further, the respective unique identifier of the respective information object 140 may be taken into account (e.g., be used) for determining if the first differences 136 and the second differences 138 are mergeable. By way of example, there may be some sorts of differences and/or changes to some sorts of information objects 140 that may be classified as mergeable or as not mergeable. In some examples, the first differences 136 and the second differences 138 may be completely independent of each other so that the first differences 136 and the second differences 138 may be mergeable. This classification may, for example, be done by a user beforehand applying a certain logic or certain criteria. In some examples, available machine learning algorithms or artificial neural networks may be used for this classification based on classifications done during a previous app development and/or merge actions of comparable artifact documents.

The act of determining if the respective differences are mergeable may hence include a check whether the differences and/or changes to the information objects 140 at hand are classified as mergeable or as not mergeable. If the first differences 136 and the second differences 138 are mergeable, the corresponding merge may be carried out. The corresponding merge may, for example, be made such that the first differences 136 and the second differences 138 are taken over by the app development source artifact 130. This may result in a merged app development source artifact 130' that does not differ from the first changed artifact 132 and the second changed artifact 134, at least concerning the considered first differences 136 and second differences 138.

The app 120 may be developed using the merged app development source artifact 130' (e.g., the original app development source artifact 130 including the first differences 136 and second differences 138 merged with the original app development source artifact 130).

In some examples, the application software component 106 and/or the processor 102 may further be configured to determine conflicts between the first differences 136 and the second differences 138. Further, the application software component 106 and/or the processor may be configured to classify the respective differences as non-conflicting if there is no conflict involving the respective difference; further, the application software component 106 and/or the processor may be configured to classify the respective differences as conflicting if there is at least one conflict involving the respective difference. The application software component 106 and/or the processor 102 may further be configured to classify the respective non-conflicting difference as mergeable and the respective conflicting difference as not mergeable.

This approach may prove to be efficient and fast if there are only few first differences 136 and second differences 138 (e.g., only one first difference 136 and only one second difference 138) to be merged with the app development source artifact 130.

In example embodiments, the application software component 106 and/or the processor 102 may further be configured to determine resolvable conflicts among the determined conflicts between the first differences 136 and the second differences 138. The application software component 106 and/or the processor 102 may further be configured to classify the respective difference with a resolvable conflict as mergeable. Alternatively or additionally, the differences with a resolvable conflict may be classified as already merged or completed. Optionally, the application software component 106 and/or the processor 102 may further be configured to resolve the resolvable conflicts.

The resolvable conflicts may, by way of example, relate to the above-mentioned classification of some sorts of differences and/or changes to some sorts of information objects 140 as mergeable. In some examples, the first differences 136 and the second differences 138 are not completely independent of each other, but the first differences 136 and the second differences 138 may nonetheless be mergeable. Such a scenario may occur, for example, if the first differences 136 and the second differences 138 concern the same information object 140, but there are only changes or differences that may be considered not critical or important. By way of example, the corresponding information object 140 corresponds to a button in a graphical user interface of the app 120 to be created, the first differences 136 concern the size of this button, and the second differences 138 concern the color of this button. In this example, the first differences 136 and the second differences 138 may be considered conflicting since the first differences 136 and the second differences 138 concern the same information object 140; however, the first differences 136 and the second differences 138 may both be taken over by the app development source artifact 130 and hence be classified as mergeable. In another example, both the first differences 136 and the second differences 138 concern the color of this button. In this example, the property "color of button" may be classified as not critical, so that, for example, the first differences 136 are taken over by the app development source artifact 130, whereas the second differences 138 are rejected and, by way of example, a corresponding information is displayed to a user developing and creating the app 120 (e.g., via the app development UI 122).

In example embodiments, the application software component 106 and/or the processor 102 may further be configured to assign interconnected differences among the first differences to first groups of differences, respectively, and interconnected differences among the second differences to second groups of differences, respectively. Further, the application software component 106 and/or the processor 102 may be configured to determine group conflicts between the first groups and the second groups. The application software component 106 and/or the processor 102 may be configured to classify the differences of groups not involved in a group conflict as mergeable. Optionally, the application software component 106 and/or the processor 102 may be configured to classify the differences of groups involved in at least one group conflict as not mergeable.

As mentioned above, in some examples, the first differences 136 and the second differences 138 may be understood as a corresponding list of differences, respectively. Among the first differences 136 and among the second differences 138, respectively, there may be differences that depend on each other and, hence, are considered to be interconnected differences. In some way, an interconnection of differences may be differences that are closely related to each other. In some examples, interconnected differences may be differences that are mutually joined or related. For example, there may be two or more differences concerning one single information object 140, so that the joint relation of these two or more differences concern this single information object 140 with the same unique identifier. These two or more differences may then be considered to be interconnected differences.

For example, if multiple properties of an information object 140 have been changed, the multiple properties of the information object 140 are considered together because generally properties of information objects 140 are considered to be dependent and changes to the properties are to be applied all or nothing. One exception to this consideration may be that one information object 140 has independent properties. Further, the grouping of differences may also take into account if any pointers were introduced or removed by the differences. In example embodiments, the interconnected differences assigned to the respective groups are those differences that may safely be merged with the app development source artifact 130. Such "safe" differences may, for example, avoid changes to the app development source artifact 130 that are not desired by the app developer or user. By way of example, "safe differences" do not break or destroy the logic that the user has conceived and developed in the app development source artifact 130 for the development and creation of the app 120.

In example embodiments, the transitive closure of a dependency relationship of first differences 136 and second differences 138, respectively, is taken into account to identify interconnected differences. This provides, for example, that three sets A, B, and C of first differences 136 are considered to be interconnected differences and thus assigned to one first group if set A is interconnected with set B, and set B is interconnected with set C. By way of example, three sets A, B, and C of first differences 136 have a dependency relationship and, for the purposes of identifying interconnected differences, the transitive closure of the dependency relationship is taken into account.

In some examples, the following differences may be considered to be interconnected differences: moving an information object 140 in the structure or hierarchy of the app development source artifact 130 from one place to another place (e.g., deleting the information object 140 at the one place and creating the information object 140 at the other place; moving a button in the graphical user interface of the app 120 from one part of the app GUI to another part of the app GUI; adding a pointer to a new information object 140 and creating the new information object 140; deleting a pointer to an information object 140 that is deleted).

In some examples, there may only be one first group and/or one second group.

Once interconnected differences have been assigned to respective first groups and to respective second groups, group conflicts between the first groups and the second groups may be determined. In example embodiments, pairs of one of the first groups and one of the second groups are considered for determining whether there is a group conflict between these two groups or not.

In some examples, one of the first groups and one of the second groups may be considered independent such that there is no group conflict if the corresponding first group and the responding second group relate to different information objects 140. In such examples, the first group and the second group may only be in a group conflict if the first group and the second group at least partly relate to the same information object 140. As mentioned above, the first differences 136 and the second differences 138 may, by way of example, include at least one of the following changes: changing (e.g., the properties of), deleting, and moving an information object 140. Further, these differences may include adding a new pointer to an information object 140 in the first changed artifact 132 and parallelly deleting the same information object 140 in the second changed artifact 134 (or vice versa). There may be further possible first differences 136 and second differences 138, some of which, however, may not give rise to group conflicts (e.g., since the further possible first differences 136 and second differences 138 relate to different information objects 140 or to creating a new information object 140 in the first changed artifact 132 or in the second changed artifact 134).

In example embodiments, one of the first groups and one of the second groups are considered not to have a group conflict if the corresponding differences may safely be merged with the app development source artifact 130. Such "safe" differences may, for example, avoid changes to the app development source artifact 130 that are not desired by the app developer or user. By way of example, "safe differences" do not break or destroy the logic that the user has conceived and developed in the app development source artifact 130 for the development and creation of the app 120.

In example embodiments, the transitive closure of the conflict relationship is taken into account to identify group conflicts of the first groups and the second groups. This provides, for example, that at least three groups A, B, and C, where A and C are two groups of the first groups and B is one group of the second groups, are considered to have a group conflict if group A has a group conflict with group B, and group B has a group conflict with group C. By way of example, the three groups A, B, and C have a conflict relationship and for the purposes of identifying a group conflict, the transitive closure of the conflict relationship is taken into account.

Once the group conflicts have been determined, the groups may be classified. The differences of groups that are not involved in the group conflict may be classified as mergeable, whereas the differences of groups that are involved in the group conflict may be classified as not mergeable.

The described grouping of changes or differences that are logically connected or interdependent may further be illustrated for better understanding with the following analogy when writing a new book. According to the grouping, newly created object structures (e.g., with new unique identifiers) may recursively be accepted and classified as mergeable (e.g., new chapters including sections of the book). Two users may create the new chapters, and both new chapters may be accepted and classified as mergeable. However, two new prefaces of the book drafted by two users may not be accepted since there may only be one preface in the book. The grouping may help to identify this conflict and to avoid an unwanted merge of the two prefaces. Transferring this illustration to the app development, the preface of the book may correspond to the home page of an app 120 to be developed; again, there may be only one app home page so that two new home pages created by two users may not be merged, but rather be classified as not mergeable. If the differences concern two separate app pages, corresponding to two new book chapters, being linked to the home page (e.g., directly or indirectly), the separate app pages may be merged and classified as mergeable. In another example, the grouping may help to delete a whole structure (e.g., a book chapter or an app page) since this may rule out keeping sections within the chapter (or subordinate pages depending on the deleted page) so that the complete chapter (or the complete page) with all sections (or subordinate pages) is deleted.

In some of these examples, the application software component 106 and/or the processor 102 may further be configured to determine resolvable group conflicts among the determined group conflicts between the first groups and the second groups. Further, the application software component 106 and/or the processor 102 may be configured to classify the differences of groups with resolvable group conflicts as mergeable. Optionally, the application software component 106 and/or the processor 102 may be configured to resolve the resolvable group conflicts.

In some examples, a resolvable group conflict may involve first differences 136 and second differences 138 that both relate to changes to a list of information objects 140, where the information objects 140 are listed according to a given order. According to a first example, a first information object is inserted in a first position of the ordered list according to the first differences 136, and a second information object is inserted in the second position of the ordered list according to the second differences 138. These differences may regularly be considered to be in a group conflict; however, these differences may also be considered to be in a resolvable group conflict. For example, the initial list of information objects 140 may be amended such that the first information object is inserted in the first position of the ordered list and the second information object is inserted in the second position of the ordered list. According to a second example, the ordered list is reordered according to the first differences 136, whereas some of the listed information objects 140 are deleted according to the second differences 138. These differences may regularly be considered to be in a group conflict; however, these differences may also be considered to be in a resolvable group conflict. For example, the initial list of information objects 140 may be reordered according to the first differences 136, and some of the listed information objects 140 are deleted according to the second differences 138. In some examples, group conflicts are determined to be resolvable if (1) a first information object is inserted in a first position of an ordered list according to the first differences 136 and a second information object is inserted in a second position of the ordered list according to the second differences 138, or (2) an ordered list is reordered according to the first differences 136, whereas some of the listed information objects 140 are deleted according to the second differences 138, or any combination thereof.

Once the resolvable group conflicts have been resolved, the differences of groups with resolvable group conflicts may be classified as mergeable. Alternatively, or additionally, the differences of groups with resolvable group conflicts may be classified as already merged or completed.

In example embodiments, the application software component 106 and/or the processor 102 may further be configured to assign at least three conflicting groups among the first groups and the second groups to a respective hypergroup, where the at least three groups are at least partly in conflict with each other. Further, the application software component 106 and/or the processor 102 may be configured to determine resolvable group conflicts among the determined group conflicts of the groups of the hypergroup. If all group conflicts of the respective hypergroup are resolvable group conflicts, the application software component 106 and/or the processor 102 may be configured to classify the differences of the respective hypergroup as mergeable and optionally, to resolve the group conflicts of the respective hypergroup. If at least one of the group conflicts of the respective hypergroup is a not resolvable group conflict, the application software component 106 and/or the processor 102 may optionally be configured to classify the differences of the respective hypergroup as not mergeable. Alternatively, or additionally, if all group conflicts of the respective hypergroup are resolvable group conflicts, the differences the resolvable hypergroup may be classified as already merged or completed.

By way of example, the at least three conflicting groups may be such that each group is in conflict with all other groups. In some examples, the at least three conflicting groups may only be partly in conflict, for example, such that in a set of three conflicting groups, the first group is in conflict with the second group (e.g., with respect to a first information object) and the second group is in conflict with the third group (e.g., with respect to a second information object), but there may not be a conflict between the first group and the third group. In this scenario, not each group is in conflict with all other groups, but rather, the three conflicting groups may only be partly in conflict with each other or all the other groups.

In example embodiments, the transitive closure of a conflict relationship is taken into account to identify group conflicts of the first groups and the second groups. By way of example, the hypergroup may include a number of groups among the first groups and the second groups that are in conflict with each other taking into account the transitive closure of a conflict relationship of the first groups and the second groups. As already explained above, this may, for example, involve at least three groups A, B, and C, where A and C are two groups of the first groups and B is one group of the second groups. The three groups A, B, and C may be considered to have a group conflict if group A has a group conflict with group B, and group B has a group conflict with group C. Accordingly, the three groups A, B, and C may form such a hypergroup. By way of example, the three groups A, B, and C have a conflict relationship, and for the purposes of identifying a hypergroup, the transitive closure of the conflict relationship is taken into account.

The determination of resolvable group conflicts among the determined group conflicts of the respective hypergroup may, for example, be done as explained above in the context of the determination of resolvable group conflicts among the determined group conflicts between the first groups and the second groups. If all group conflicts of the respective hypergroup are resolvable group conflicts, the resolution of the group conflicts of the respective hypergroup may, for example, be done as explained above in the context of the resolution of resolution group conflicts.

In some examples, the application software component 106 and/or the processor 102 may be further configured to classify a first difference among the first differences 136 and a second difference among the second differences 138 as mergeable if the first difference and the second difference concern at least one mergeable property of at least one first information object 140, at least two independent properties of at least one second information object 140, and/or two different information objects 140.

By way of example, the respective mergeable property of the respective first information object 140 may be a property of minor importance, such as the color of a button or window in the graphical user interface of the app 120.

In some examples, the at least two independent properties of the corresponding information object 140 may concern the location and the color of a button or window in the graphical user interface of the app 120. Most properties of information objects 140, however, are not independent so that accepting or rejecting the corresponding first difference 136 requires accepting or rejecting the corresponding second difference 138, respectively. An example of such a dependent property may be moving a button or window in the graphical user interface of the app 120 from point A(x,y) to B(x',y'), where accepting the horizontal move x→x' requires accepting the vertical move y→y' to avoid an unintentional misplacement of the corresponding button or window.

In many examples, two different information objects 140 may be considered to be independent so that the first difference concerning the one information object 140 and the second difference concerning the other information object 140 may be classified as mergeable.

By way of example, the information objects may at least partly be organized in a graph structure, where for the determination if differences among the first differences 136 and the second differences 138 are mergeable, the graph structure of the information objects 140 and the respective unique identifier of the information objects 140 of the graph structure are taken into account, respectively.

The graph structure may be, in context of graph theory, as a structure amounting to a set of objects in which some pairs of the objects are in some sense "related". Generally, the graph structure may include the information objects 140 corresponding to the vertices or nodes of the graph, where the information objects 140 may be related to each other and hence be linked to each other via edges or lines. So, in some examples, the respective vertex or node may correspond to a respective information object 140 with a respective unique identifier. The graph structure may include loops (e.g., edges or lines that join a vertex to itself). Such loops may be realized by pointers linking an information object 140 to another information object 140. The graph structure may include or be characterized by a tree (e.g., an undirected graph in which any two vertices are connected by exactly one path).

By way of example, the respective unique identifier of the information objects 140 of the graph structure may be used to determine if the corresponding first differences 136 and second differences 138 are mergeable (e.g., by identifying correlations and dependencies in graph structure). In some examples, considering the graph structure may facilitate recognizing related and/or interdependent differences such as deleting and information object 140 and correspondingly deleting a pointer directed to the deleted information object 140.

In some examples, the information objects 140 are at least partly organized in a tree structure. The application software component 106 and/or the processor 102 may be configured to classify differences among the first differences 136 and the second differences 138 as mergeable if the respective differences concern two different information objects 140 arranged in different branches of the tree structure.

By way of example, the application software component 106 and/or the processor 102 may further be configured to classify differences among the first differences 136 and the second differences 138 as mergeable if the respective differences concern a list of a first type of information objects 140, where the list of the first type and/or the order of the information objects of the list of the first type is defined as mergeable.

By way of example, the list of the first type may be an enumeration of information objects 140 without a preferred order, ranking, or maximum or minimum number of listed information objects 140. Further, the information objects 140 of the list of the first type may only be used in the background of the app 120 so that these information objects 140 are not displayed in the graphical user interface or pages of the app 120. In this case, the order or number of the listed information objects 140 may also not matter. An example of such a list may be the list of entities in a domain model that is used for model-based app development that is explained in more detail below.

By way of example, the respective differences may include an addition, a deletion or a move of an information object 140 to/from/in the list, respectively.

It should also be appreciated that in some of these examples, the respective differences include an addition of an information object 140, where the addition of the information object 140 is made at a given position relative to a position of at least one other information object 140 of the list of the first type, or where the addition of an information object 140 is made at the end of the list of the first type if the at least one other information object 140 has been removed from the list of the first type.

In example embodiments, the addition of the information object 140 is either made at a given position relative to a position of another information object 140 of the list of the first type or, if this other information object 140 of the list of the first type has been removed from the list of the first type, at the end of the list of the first type. Such examples may provide for mergeable, ordered lists, where the order of the information objects 140 in the list does not matter to a user. Corresponding additions may still be merged automatically. For example, the list of information objects 140 may correspond to a list of widgets on a page of the app 120 to be created, where this list of widgets is ordered. If two users make changes to this list of widgets that are far enough apart from each other, it may still be fine to combine the changes while respecting the positions of the insertions.

Even if one of the two users reorders the list and the changes are too close, an automatic merge of the differences may still be done. In such cases, a "review conflict" may be left behind, reminding the user to check the final order of the list. Such a review conflict may, by way of example, be displayed via the app development UI 122 to a user during or after the merge of the corresponding first differences 136 and second differences 138 with the app development source artifact 130. The display in the app development UI 122 may include the corresponding first differences 136, second differences 138, and the merged version of the app development source artifact 130'. Additionally, the display in the app development UI 122 may include one or more buttons for the user to select/confirm the merge of either the first differences 136 and/or the second differences 138 or rejecting both the first differences 136 and the second differences 138.

In example embodiments, the application software component 106 and/or the processor 102 may further be configured to classify differences among the first differences 136 and the second differences 138 as not mergeable if the respective differences concern the order of a list of a second type of information objects 140, where the order of the list of the second type is defined as fixed.

Corresponding differences concerning the order of the list of the second type may, by way of example, be an addition, removal, or a reordering of the information objects 140 to/from/of the list of the second type. By way of example, inserting two different information objects 140 in the same position of the list of the second type would concern the order of the list of the second type and hence imply that the corresponding differences are classified as not mergeable. Exemplary lists of the second type may include lists of information objects 140 to be displayed to and selected by a user in the app 120 to be developed (e.g., in app pages). Lists of the second type may further be lists with a strict order and optionally a given number of listed information objects 140 to be respected.

In some examples, the order of the listed information objects 140 of the corresponding list of the second type may be defined and thus fixed by a user. The order may also be defined, by way of example, by certain rules to be respected by the list (e.g., an alphabetical order of the listed information objects 140 of the corresponding list of the second type).

In example embodiments, the application software component 106 and/or the processor 102 may further be configured to classify differences among the first differences 136 and the second differences 138 as not mergeable if the respective differences concern a list of a third type of information objects 140 and result in changed properties of the list of the third type. The changed properties of the list of the third type do not comply with given acceptable properties of the list of the third type.

Corresponding differences concerning the order of the list of the third type may, by way of example, be an addition, removal, or a reordering of the information objects 140 to/from/of the list of the third type. In some examples, the acceptable properties of the listed information objects 140 of the corresponding list of the third type may be defined and thus fixed by a user. The acceptable properties may also be defined, by way of example, by certain rules to be respected by the list. By way of example, a corresponding list of the third type may have a defined length (e.g., less than four information objects 140). Then, if two different users wish to add one information object 140, respectively, to a list of the third type consisting of two information objects 140, the resulting merged list of the third type would consist of four information objects 140 that do not comply with the acceptable properties. The corresponding first differences 136 and second differences 138 would hence be classified as not mergeable.

In some of these examples, the acceptable properties of the list of the third type include a fixed order or a fixed number of the information objects 140 of the list of the third type.

In further examples, the acceptable properties may include the type or properties of listed information objects 140, such as integers, strings, locations, names, etc.

In example embodiments, the app development source artifact 130, the first changed artifact 132, and/or the second changed artifact 134 includes at least a part of a model that is used for model-based app development, where the model or the part of the model is taken into account for the determination if the first differences 136 and the second differences 138 are mergeable.

For model-based app development, a model that may describe or characterize the app 120 to be created and/or functionalities of the app 120 to be created may be used. By way of example, this model may include the above-mentioned information objects 140, where these information objects 140 may have certain properties. This model may include, for example, pages of the app, where the pages may serve to display information, such as the information objects 140 or information derived from the information objects 140, to an app user. In further examples, this model may include workflows (e.g., routines for processing data related to information objects 140 or for interacting with the app user). In some examples, the workflows create relations or pointers (e.g., optionally also edges, lines, or loops in terms of the above-mentioned graph structure) between information objects 140 that are part of the model. This model may, by way of example, include a metamodel that may describe the properties of elements, where objects are instances of elements and where these objects may be included in the above-mentioned information objects 140.

Below is an example metamodel describing the properties of an element:

```
modelunit Enumeration : Document {
    public values: list EnumerationValue
}
public element EnumerationValue {
    public name: String
    caption: Text = Text( )
    image: Image by-name optional
}
```

An enumeration is a document that includes a number of EnumerationValues, and each value has a name, a caption described by a Text object, and refers to an image by name.

There are four kinds of properties:
1. Primitive value property: the property value is of a primitive type such as integer or string. See 'name' in the example above.
2. Primitive list property: the property value is a list of values of primitive type. For example, a list of widths of columns.
3. Object value property: the property value is a contained object. See 'caption' in the example above. A Text object represents a translatable text and contains other objects that list the translations.
4. Object list property: the property contains a list of contained objects. See 'values' in the example above.

Model-based app development and taking the model into account for merging changes or differences may offer various advantages. This model or domain model may be stored in the app development source artifact 130 (e.g., in part, completely, with or without additional information). This model may, for example, include a domain model that may, for example, be understood as an abstracted relational database (e.g., based upon standard UML notation and object-oriented principles). In other words, the domain model may be a visual representation of the data that the app 120 includes or consists of. Such a visual approach to application development is particularly advantageous since the visual approach allows for building apps 120 with agility and for quickly building and growing an app 120 over time. The domain model may, by way of example, include or consist of three main elements: entities that represent objects; attributes that assign properties and values to the entities; and associations that allow entities to communicate with one another. The associations may, by way of example, be equivalent with the above-mentioned pointers.

The structure of the model or the domain model may determine what the database for storing the information objects 140, the model, and/or the domain model will look like. Each entity may become a database table, and each attribute may become a column in the database. Every object stored in the database (e.g., a training course) may become a row in the corresponding database table. This may imply that if something is not in the domain model, it cannot be added to the database.

By way of example, a database table for an entity "Training Course" with these attributes

| Training Course |
| --- |
| Title |
| Duration |
| Price | may look like this when a number of training events for this training course may be scheduled:

| ID | Title | Duration | Price |
| --- | --- | --- | --- |
| ... | ... | ... | ... |

Herein, ID is not an attribute, but may be the unique identifier mentioned above. The unique identifier may make sure that every object (e.g., information object 140) always has a unique identifier (ID) so that the system knows which object it is.

Changes to the model and/or the domain model may be made as often as desired, and the database will synchronize when the app 120 is published again. For example, when the name of an entity or attribute or generally an information object 140 is changed, the app 120 will still work, thanks to the corresponding unique identifier.

As mentioned above, the model may include a visual representation of the data that the app 120 includes or consists of. This provides, for example, that the model may include all information characterizing the functionalities of the app 120 to be created. Hence, the model may be considered as one of the most important work results and core intellectual property of the user(s) developing the app. Therefore, it is very important to protect the model and to make sure not to "break" the model when merging the first differences 136 and the second differences 138 with the app development source artifact 130. For example, changing essential characteristics of the model triggered by a potential merge of conflicting changes should be avoided.

To this end, the model or the part of the model included in the app development source artifact 130 are taken into account when determining if the first differences 136 and the second difference 138 are mergeable.

By way of example, if the first differences 136 and the second differences 138 are classified as not mergeable, the application software component 106 and/or the processor 102 may further be configured to display the first differences 136 and the second differences 138 to a user through an app development UI 122 for selecting the first differences 136 and/or the second difference 138 to be introduced to the app development source artifact 130, or for rejecting the first differences 136 and the second difference 138. The application software component 106 and/or the processor 102 may further be configured to capture the selection intent of the user in response to user interactions with the app development UI 122 and to merge the first differences 136 and/or the second differences 138 with the app development source artifact 130 or to leave to the app development source artifact 130 unchanged corresponding to the captured selection intent of the user.

In some examples, the app development UI 122 may be accessible to the user through a browser or a client. In some example embodiments, the functionalities of app development UI 122 are available in one unified app interaction UI that is communicatively coupled to the app management platform 124 and provided to the user for interaction.

The provided app development UI 122 may, by way of example, interact with an ADF, IDE, or visual model-based representations that are mentioned above and may be used to develop the app 120. The app development UI 122 may be displayed to the user using the display device 112. The user may provide app development intent of the user via input of the user to the app development UI 122 using the input device 110.

By way of example, a visual representation of a model characterizing the app 120 may be displayed to a user via the app development UI 122. Such an example may occur in the context of the above-mentioned low-code app development that may involve visual model-based app development. In example embodiments, the creation or generation of the app 120 using the app development UI 122 and/or the app management platform 124 may already be completed when a model and/or visual representation characterizing the app 120 (e.g., the functionalities and/or interfaces of the app) has been achieved based on the interaction with the app development UI 122 by the user.

In example embodiments, the application software component 106 and/or the processor 102 may further be configured to classify the first differences 136 and the second differences 138 as mergeable if the first differences 136 and the second differences 138 are identical.

In some examples, if the first differences 136 and the second differences 138 are mergeable, the application software component 106 and/or the processor 102 may further be configured to display the first differences 136, the second differences 138, and at least the corresponding part of the merged app development source artifact 130' to a user through the app development UI 122. By way of example, this display to a user may occur if resolvable conflicts related to corresponding first differences 136 and second differences 138 (e.g., the above-mentioned group conflicts) have been resolved. This display to the user may further occur, for example, if a "review conflict" as described above has been identified during the merge of corresponding first differences 136 and second differences 138.

The described examples may provide an efficient way for users to create apps 120 by enabling the described enhanced creation of apps 120. Thus, the described examples may reduce the total cost of ownership of the development and management of apps 120 and of such apps in general, by alleviating or at least minimizing the need for users or administrators to have advanced coding knowledge or to manually make conscious selections of many options. Such efficient app creation may be leveraged in any industry (e.g., Aerospace & Defense, Automotive & Transportation, Consumer Products & Retail, Electronics & Semiconductor, Energy & Utilities, Industrial Machinery & Heavy Equipment, Marine, or Medical Devices & Pharmaceuticals). Such app creation may also be applicable to a consumer facing the need to quickly create own apps.

For example, the above examples are equally applicable to the computer system 100 (e.g., the app management platform 124) arranged and configured to execute the acts of the computer-implemented method of creating an app 120 and to the corresponding computer-readable medium explained in the present patent document, respectively.

Throughout this patent document, the first differences 136 and the second differences 138 may respectively be understood such that only one amendment is made in the first changed artifact 132 and the second changed artifact 134 compared to the app development source artifact 130, respectively. This one amendment may be, for example, one of the differences explained above (e.g., adding, moving, or deleting one information object 140, creating, changing, or deleting a pointer to another information object 140, and/or changing one property of one information object 140). In example embodiments, the first differences 136 and the second differences 138 may respectively include two or more of such amendments.

The differences may, by way of example, be such that, when comparing the app development source artifact 130 with the first changed artifact 132 and the second changed artifact 134, respectively, one or more information objects 140 are added, moved, or deleted, a pointer to another information object 140 is created, changed, or deleted, or such that one or more properties of one or more information objects 140 are changed. Further, by way of example, the first differences 136 and the second differences 138 may respectively be such that only one amendment is made in the first changed artifact 132 and the second changed artifact 134, respectively. This one amendment may be, for example, one of the explained differences (e.g., additionally, move or deletion of one information object 140 or change of one property of one information object 140).

Further, an analogous method may be applied when dealing with one or more additional changed artifacts. The corresponding additional differences along with the unique identifiers of corresponding information objects 140 may also be taken into account when determining differences, when determining whether the determined are mergeable, and when merging the differences with the app development source artifact 130 if the differences are mergeable. Also, the explained methodology relating to group conflicts may be applied to such cases.

Figure 2:
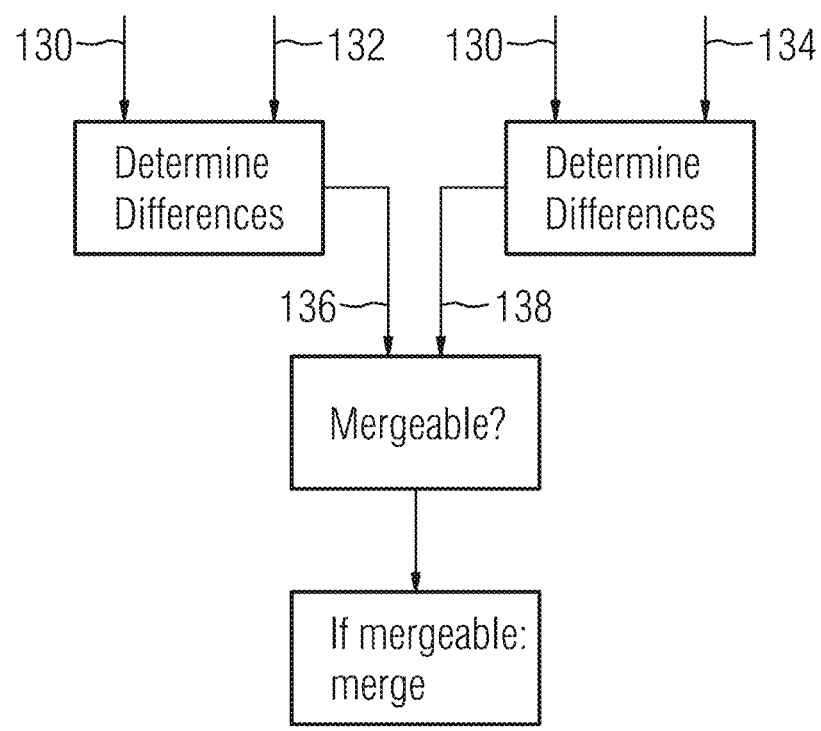
FIGS. 2-5 illustrate a flow diagram of example methodologies that facilitate creating apps in a product system, respectively.

FIG. 2 illustrates a flow diagram of an example methodology that facilitates creating apps 120 in a product system 100. First, the first differences 136 may be determined between the app development source artifact 130 and the first changed artifact 132, and the second differences 138 may be determined between the app development source artifact 130 and the second changed artifact 134. Then, it may be determined if the first differences 136 and the second differences 138 are mergeable taking into account the respective unique identifier of the respective information objects 140. If the first differences 136 and the second differences 138 are mergeable, the first differences 136 and the second differences 138 may be merged with the app development source artifact 130.

Figure 3:
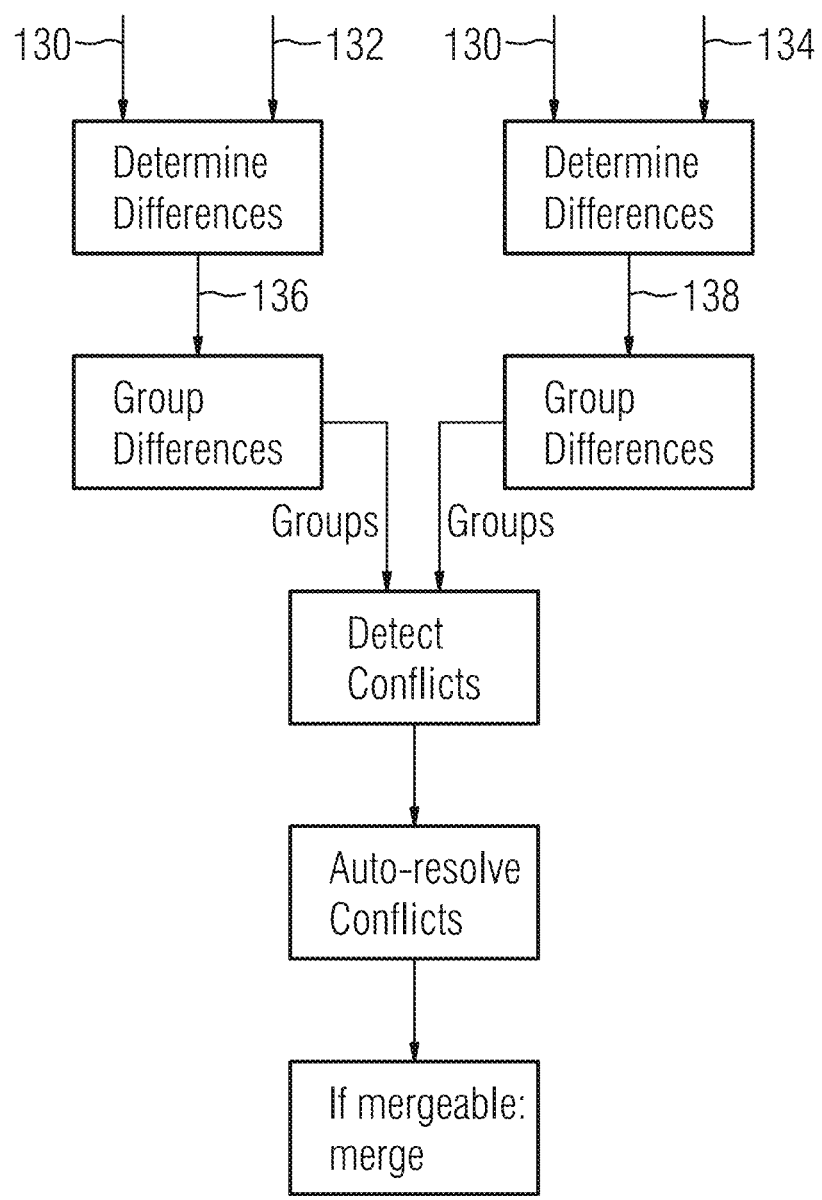

FIG. 3 illustrates a flow diagram of another example methodology that facilitates creating apps 120 in a product system 100. First, the first differences 136 may be determined between the app development source artifact 130 and the first changed artifact 132, and the second differences 138 may be determined between the app development source artifact 130 and the second changed artifact 134. Then, the first differences 136 may be grouped by assigning interconnected differences among the first differences 136 to first groups of differences. Accordingly, the second differences 138 may be grouped by assigning interconnected differences among the second differences 138 two second groups of differences. For these two acts as well as for other acts, the respective unique identifier of the respective information objects 140 may be taken into account. Conflicts between first and second groups may then be detected by determining group conflicts between the first groups and the second groups. By way of example, the differences of groups not involved in a group conflicts may be classified as mergeable and optionally, the differences of groups involved in at least one group conflict as not mergeable. Some of the conflicts may then be auto-resolved by determining resolvable group conflicts among the determined group conflicts between the first groups and the second groups and by resolving the resolvable group conflicts. By way of example, the differences of groups with resolvable group conflicts may be classified as mergeable. Finally, if the first differences 136 and the second differences 138 are mergeable, the first differences 136 and the second differences 138 may be merged with the app development source artifact 130. This merge may include the differences of groups with resolvable group conflicts that have been resolved and classified as mergeable. Alternatively, or additionally, the differences of groups with resolvable group conflicts may be classified as already merged or completed.

Figure 4:
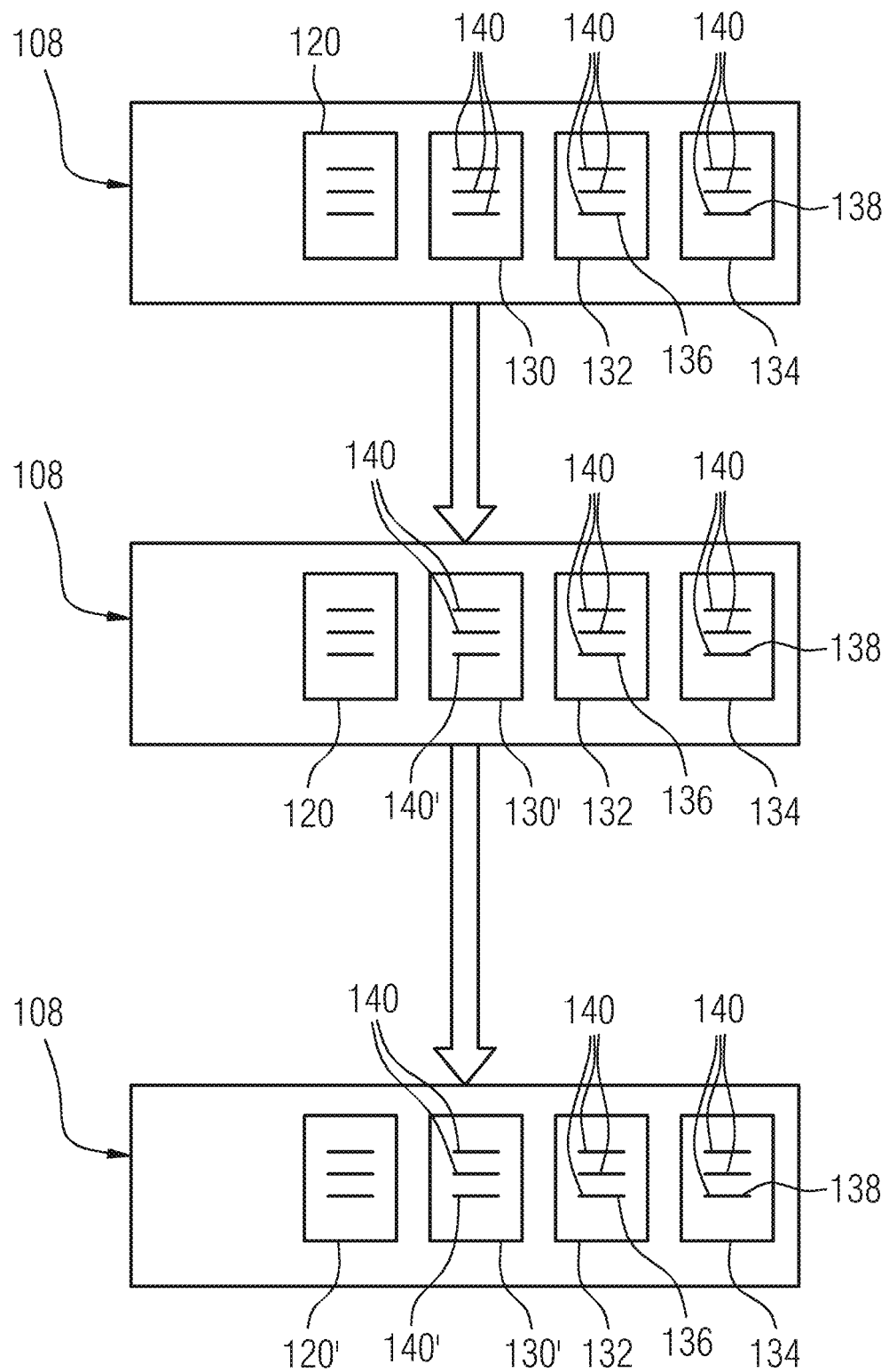

FIG. 4 illustrates a flow diagram of yet another example methodology that facilitates creating apps 120 in a product system 100. The data store 108 may include at least a draft version of the app to be created 120, the app development source artifact 130, the first changed artifact 132, and the second changed artifact 134. The app development source artifact 130, the first changed artifact 132, and the second changed artifact 134 may each include information objects 140 to which a unique identifier may be assigned, where the first changed artifact 132 may differ from the app development source artifact 130 in first differences 136 and the second changed artifact 134 may differ from the app development source artifact 130 and second differences 138.

The first differences 136 and the second differences 138 may be determined. Further, it may be determined whether the first differences 136 and the second differences 138 may be mergeable taking into account the respective unique identifier of the respective information objects 140. If the first differences 136 and the second differences 138 are mergeable, the first differences 136 and the second differences 138 may be merged with the app development source artifact 130. The thus obtained merged app development source artifact 130' may then include an amended information object 140'.

Eventually, an amended app 120' may be developed by using the merged app development source artifact 130' including the amended information object 140'.

It is important to note that while the disclosure includes a description in the context of a fully functional system and/or a series of acts, those skilled in the art will appreciate that at least portions of the mechanism of the present disclosure and/or described acts are capable of being distributed in the form of computer-executable instructions contained within non-transitory machine-usable, computer-usable, or computer-readable medium in any of a variety of forms. Those skilled in the art will also appreciate that the present disclosure applies equally regardless of the particular type of instruction or data bearing medium or storage medium utilized to actually carry out the distribution. Examples of non-transitory machine usable/readable or computer usable/readable mediums include: ROMs, EPROMs, magnetic tape, floppy disks, hard disk drives, SSDs, flash memory, CDs, DVDs, and Blu-ray disks. The computer-executable instructions may include a routine, a sub-routine, programs, applications, modules, libraries, a thread of execution, and/or the like. Still further, results of acts of the methodologies may be stored in a computer-readable medium, displayed on a display device, and/or the like.

Figure 5:
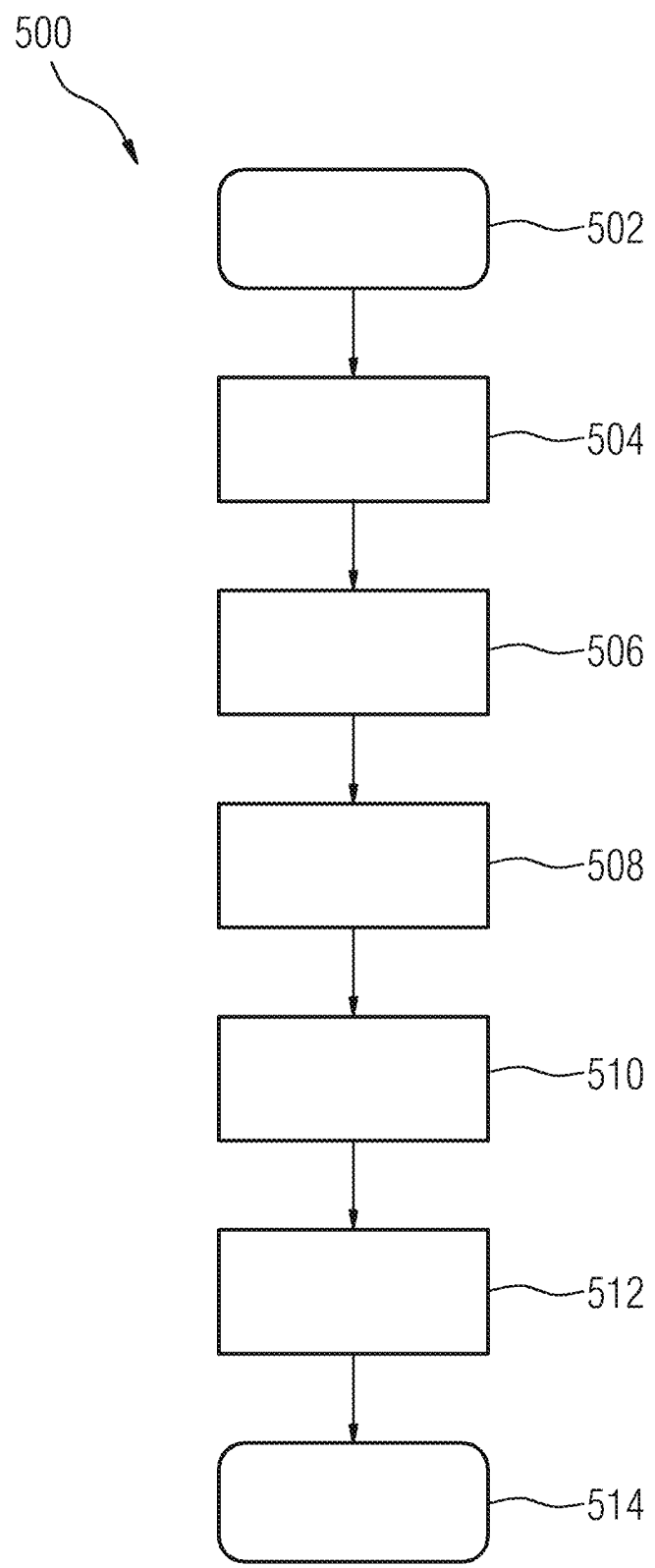

Referring now to FIG. 5, a methodology 500 that facilitates creating apps is illustrated. The method may start at 502, and the methodology may include several acts carried out through operation of at least one processor.

These acts may include: an act 504 of providing an app development source artifact; an act 506 of providing a first changed artifact and a second changed artifact differing from the app development source artifact in first differences and in second differences, respectively, where the app development source artifact, the first changed artifact, and the second changed artifact include information objects to which a unique identifier is assigned, respectively; an act 508 of determining the first differences and the second differences, respectively; an act 510 of determining if the first differences and the second differences are mergeable taking the respective unique identifier of the respective information objects into account; and if the first differences and the second differences are mergeable, an act 512 of merging the first differences and the second differences with the app development source artifact, and an act 514 of developing the app by using the merged app development source artifact. At 516 the methodology may end.

The methodology 500 may include other acts and features discussed previously with respect to the computer-implemented method of creating an app.

For example, the methodology may further include the acts of assigning interconnected differences among the first differences to first groups of differences, respectively, and interconnected differences among the second differences to second groups of differences, respectively. The method may further include determining group conflicts between the first groups and the second groups, and classifying the differences of groups not involved in a group conflict as mergeable and the differences of groups involved in at least one group conflict as not mergeable.

Further, the methodology may further include the acts of determining resolvable group conflicts among the determined group conflicts between the first groups and the second groups, resolving the resolvable group conflicts, and classifying the differences of groups with resolvable group conflicts as mergeable.

Example embodiments of the methodology may also include the acts of assigning at least three conflicting groups among the first groups and the second groups to a respective hypergroup. The at least three groups are at least partly in conflict with each other. Resolvable group conflicts are determined among the determined group conflicts of the respective hypergroup. If all group conflicts of the respective hypergroup are re-solvable group conflicts, the group conflicts of the respective hypergroup are resolved, and the differences of the respective hypergroup are classified as mergeable.

Further examples of the methodology may further include the act of classifying differences among the first differences and the second differences as mergeable if the respective differences concern a list of a first type of information objects. The list of the first type and/or the order of the information objects of the list of the first type is defined as mergeable.

Further examples of the methodology may further include the act of classifying differences among the first differences and the second differences as not mergeable if the respective differences concern the order of a list of a second type of information objects. The order of the list of the second type is defined as fixed.

Further, the methodology may further include the acts of classifying differences among the first differences and the second differences as not mergeable if the respective differences concern a list of a third type of information objects and result in changed properties of the list of the third type. The changed properties of the list of the third type do not comply with given acceptable properties of the list of the third type.

Example embodiments of the methodology may also include, if the first differences and the second differences are classified as not mergeable, the acts of displaying the first differences and the second differences to a user through an app development UI for selecting the first differences and/or the second difference to be introduced to the app development source artifact or for rejecting the first differences and the second difference. The selection intent of the user may be captured in response to user interactions with the app development UI, and the first differences and/or the second differences may be merged with the app development source artifact or leaving to the app development source artifact unchanged corresponding to the captured selection intent of the user.

As discussed previously, acts associated with these methodologies (other than any described manual acts such as an act of manually making a selection through the input device) may be carried out by one or more processors. Such processor(s) may be included in one or more data processing systems, for example, that execute software components operative to cause these acts to be carried out by the one or more processors. In an example embodiment, such software components may include computer-executable instructions corresponding to a routine, a sub-routine, programs, applications, modules, libraries, a thread of execution, and/or the like. Further, software components may be written in and/or produced by software environments/languages/frame-works such as Java, JavaScript, Python, C, C #, C++, or any other software tool capable of producing components and graphical user interfaces configured to carry out the acts and features described herein.

Figure 6:
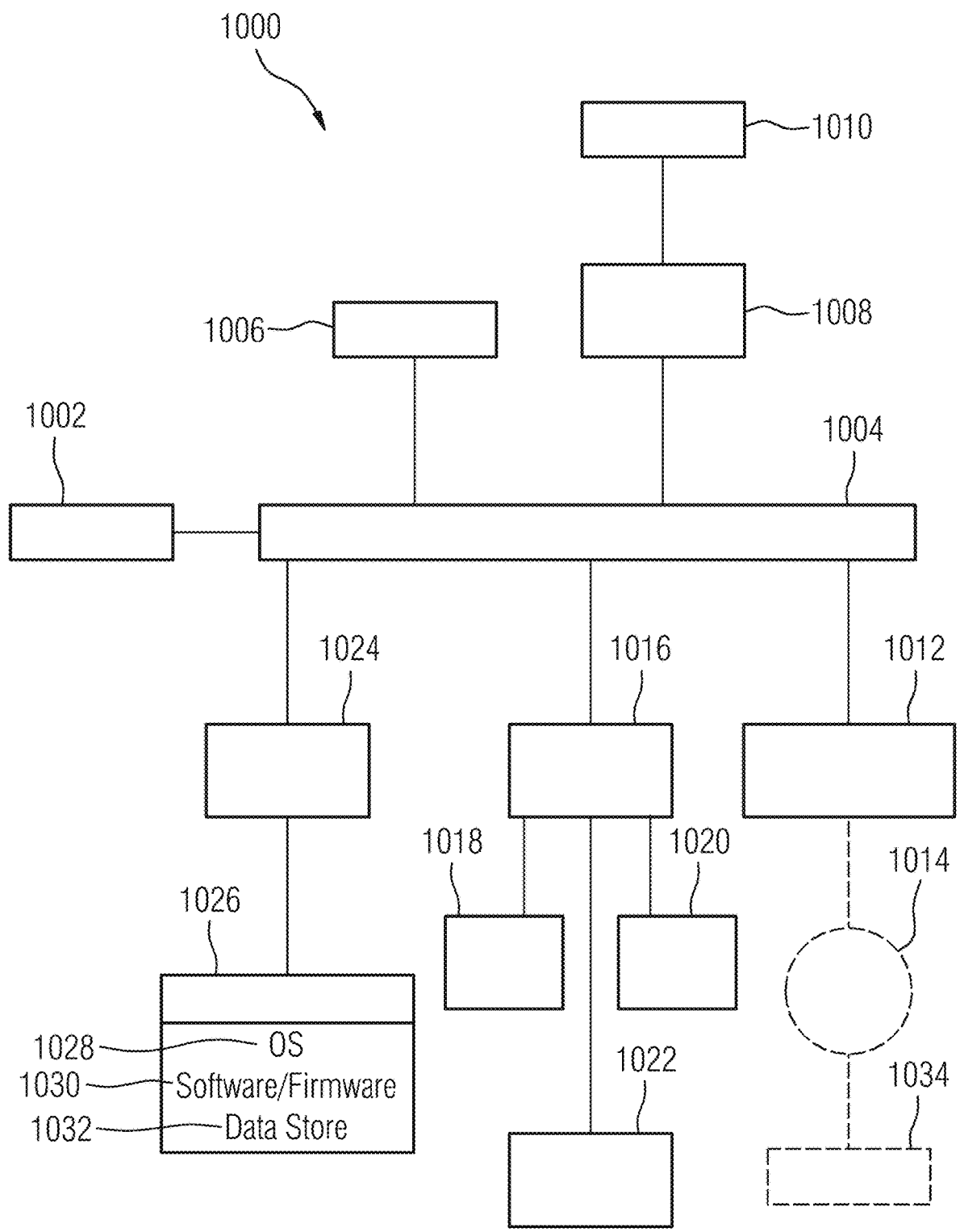
FIG. 6 illustrates a block diagram of a data processing system in which an embodiment may be implemented.

FIG. 6 illustrates a block diagram of one embodiment of a data processing system 1000 (e.g., a computer system) in which an embodiment may be implemented, for example, as a portion of a product system, and/or other system operatively configured by software or otherwise to perform the processes as described herein. The data processing system 1000 may include, for example, the app management platform 124 and/or the computer system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. In some embodiments, one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (e.g., Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (e.g., connected to speakers and/or microphones). Various peripherals may be connected to the I/O controller(s) (e.g., via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Many devices referred to as input devices or output devices may both provide inputs and receive outputs of communications with the data processing system. For example, the processor 1002 may be integrated into a housing (e.g., such as a tablet) that includes a touch screen that serves as both an input and display device. Further, some input devices (e.g., such as a laptop) may include a plurality of different types of input devices (e.g., touch screen, touch pad, keyboard). Other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, which may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (e.g., that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed, and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data that is retrievable by a processor.

The communication controllers 1012 may be connected to the network 1014 (not a part of data processing system 1000), which may be any public or private data processing system network or combination of networks, as known to those of skill in the art, including the Internet. Data processing system 1000 may communicate over the network 1014 with one or more other data processing systems such as a server 1034 (e.g., also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, when referring to a data processing system, such a system may be implemented across a number of data processing systems organized in a distributed system in communication with each other via a network.

Further, the term "controller" may be any device, system, or part thereof that controls at least one operation, whether such a device is implemented in hardware, firmware, software or some combination of at least two of the same. The functionality associated with any particular controller may be centralized or distributed, whether locally or remotely.

In addition, data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, the processor described herein may be located in a server that is remote from the display and input devices described herein. In such an example, the described display device and input device may be included in a client device that communicates with the server (and/or a virtual machine executing on the server) through a wired or wireless network (e.g., which may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system that may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

The words or phrases used herein should be construed broadly, unless expressly limited in some examples. For example, the terms "include" and "comprise," as well as derivatives thereof, provide inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, providing and/or, unless the context clearly indicates otherwise. The phrases "associated with" and "associated therewith," as well as derivatives thereof, may be to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions, or acts from each other. For example, a first element, function, or act may be termed a second element, function, or act, and, similarly, a second element, function, or act may be termed a first element, function, or act, without departing from the scope of the present disclosure.

In addition, phrases such as "processor is configured to" carry out one or more functions or processes, may be that the processor is operatively configured to or operably configured to carry out the functions or processes via software, firmware, and/or wired circuits. For example, a processor that is configured to carry out a function/process may correspond to a processor that is executing the software/firmware, which is programmed to cause the processor to carry out the function/process and/or may correspond to a processor that has the software/firmware in a memory or storage device that is available to be executed by the processor to carry out the function/process. A processor that is "configured to" carry out one or more functions or processes may also correspond to a processor circuit particularly fabricated or "wired" to carry out the functions or processes (e.g., an ASIC or FPGA design). Further, the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may provide that an element is relatively near to but not in contact with a further element, or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present patent document should be read as implying that any particular element, step, act, or function is an essential element, which must be included in the claim scope; the scope of patented subject matter is defined only by the allowed claims.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of creating an app, the computer-implemented method comprising:
    providing an app development source artifact;
    providing a first changed artifact and a second changed artifact differing from the app development source artifact in first differences and in second differences, respectively, wherein the app development source artifact, the first changed artifact, and the second changed artifact include information objects to which a unique identifier is assigned, respectively;

determining the first differences and the second differences, respectively;
determining whether the first differences and the second differences are mergeable taking the respective unique identifier of the respective information objects into account;
when the first differences and the second differences are mergeable:
merging the first differences and the second differences with the app development source artifact; and
developing the app using the merged app development source artifact,
wherein the app development source artifact, the first changed artifact, the second changed artifact, or any combination thereof includes at least a part of a model that is used for model-based app development,
wherein the model characterizes the app to be created, functionalities of the app to be created, or the app to be created and the functionalities of the app to be created,
wherein the model includes entities that represent the information objects, attributes that assign properties and values to the entities, associations that allow entities to communicate with one another, or any combination thereof,
wherein the model includes workflows for processing data related to the information objects or pages of the app, the pages being configured to display the information objects or information derived from the information objects to a user of the app, and
wherein the model or the part of the model is taken into account for the determining of whether the first differences and the second differences are mergeable.

2. The computer-implemented method of claim 1, further comprising:
assigning interconnected differences among the first differences to first groups of differences, respectively, and assigning interconnected differences among the second differences to second groups of differences, respectively;
determining group conflicts between the first groups and the second groups; and
classifying differences of groups not involved in a group conflict of the group conflicts as mergeable and differences of groups involved in at least one group conflict of the group conflicts as not mergeable.

3. The computer-implemented method of claim 2, further comprising:
determining resolvable group conflicts among the determined group conflicts between the first groups and the second groups; and
classifying the differences of groups with resolvable group conflicts as mergeable.

4. The computer-implemented method of claim 2, further comprising:
assigning at least three conflicting groups among the first groups and the second groups to a respective hypergroup, wherein the at least three groups are at least partly in conflict with each other;
determining resolvable group conflicts among the determined group conflicts of the respective hypergroup;
if all group conflicts of the respective hypergroup are resolvable group conflicts, classifying the differences of the respective hypergroup as mergeable.

5. The computer-implemented method of claim 1, further comprising:
classifying a first difference among the first differences and a second difference among the second differences as mergeable when the first difference and the second difference concern at least one mergeable property of at least one first information object, at least two independent properties of at least one second information object, two different information objects, or any combination thereof.

6. The computer-implemented method of claim 1, wherein the information objects are at least partly organized in a graph structure, and
wherein for the determining of whether the first differences and the second differences are mergeable, the graph structure of the information objects and the respective unique identifier of the information objects of the graph structure are taken into account, respectively.

7. The computer-implemented method of claim 1, further comprising:
classifying differences among the first differences and the second differences as mergeable when the respective differences concern a list of a first type of information objects,
wherein the list of the first type of information objects, an order of the information objects of the list of the first type of information objects, or the list of the first type of information objects and the order of the information objects of the list of the first type of information objects are defined as mergeable.

8. The computer-implemented method of claim 7, wherein the respective differences include an addition of an information object, and
wherein the addition of the information object is made at a given position relative to a position of at least one other information object of the list of the first type of information objects, or the addition of the information object is made at the end of the list of the first type of information objects when the at least one other information object has been removed from the list of the first type of information objects.

9. The computer-implemented method of claim 1, further comprising:
classifying differences among the first differences and the second differences as not mergeable when the respective differences concern an order of a list of a second type of information objects,
wherein the order of the list of the second type of information objects is fixed.

10. The computer-implemented method of claim 1, further comprising:
classifying differences among the first differences and the second differences as not mergeable when the respective differences concern a list of a third type of information objects and result in changed properties of the list of the third type of information objects,
wherein the changed properties of the list of the third type of information objects do not comply with given acceptable properties of the list of the third type of information objects.

11. The computer-implemented method of claim 10, wherein the acceptable properties of the list of the third type of information objects include a fixed order or a fixed number of the information objects of the list of the third type.

12. The computer-implemented method of claim 1, further comprising:
when the first differences and the second differences are classified as not mergeable:

displaying the first differences and the second differences to a user through an app development user interface (UI) for selecting the first differences, the second differences, or the first differences and the second differences to be introduced to the app development source artifact or for rejecting the first differences and the second differences;

capturing a selection intent of the user in response to user interactions with the app development UI; and merging the first differences, the second differences, or the first differences and the second differences with the app development source artifact or leaving the app development source artifact unchanged corresponding to the captured selection intent of the user.

13. A computer system comprising:

a processor configured to create an app, the creation of the app comprising:

provision of an app development source artifact;

provision of a first changed artifact and a second changed artifact differing from the app development source artifact in first differences and in second differences, respectively, wherein the app development source artifact, the first changed artifact, and the second changed artifact include information objects to which a unique identifier is assigned, respectively;

determination of the first differences and the second differences, respectively;

determination of whether the first differences and the second differences are mergeable taking the respective unique identifier of the respective information objects into account;

when the first differences and the second differences are mergeable:

merge of the first differences and the second differences with the app development source artifact; and development of the app using the merged app development source artifact, wherein the app development source artifact, the first changed artifact, the second changed artifact, or any combination thereof includes at least a part of a model that is used for model-based app development, wherein the model characterizes the app to be created, functionalities of the app to be created, or the app to be created and the functionalities of the app to be created, wherein the model includes entities that represent the information objects, attributes that assign properties and values to the entities, associations that allow entities to communicate with one another, or any combination thereof, wherein the model includes workflows for processing data related to the information objects or pages of the app, the pages being configured to display the information objects or information derived from the information objects to a user of the app, and wherein the model or the part of the model is taken into account for the determination of whether the first differences and the second differences are mergeable.

14. In a non-transitory computer-readable storage medium that stores instructions executable by a computer system to create an app, the instructions comprising:

providing an app development source artifact;

providing a first changed artifact and a second changed artifact differing from the app development source artifact in first differences and in second differences, respectively, wherein the app development source artifact, the first changed artifact, and the second changed artifact include information objects to which a unique identifier is assigned, respectively;

determining the first differences and the second differences, respectively;

determining whether the first differences and the second differences are mergeable taking the respective unique identifier of the respective information objects into account;

when the first differences and the second differences are mergeable:

merging the first differences and the second differences with the app development source artifact; and developing the app using the merged app development source artifact, wherein the app development source artifact, the first changed artifact, the second changed artifact, or any combination thereof includes at least a part of a model that is used for model-based app development, wherein the model characterizes the app to be created, functionalities of the app to be created, or the app to be created and the functionalities of the app to be created, wherein the model includes entities that represent the information objects, attributes that assign properties and values to the entities, associations that allow entities to communicate with one another, or any combination thereof, wherein the model includes workflows for processing data related to the information objects or pages of the app, the pages being configured to display the information objects or information derived from the information objects to a user of the app, and wherein the model or the part of the model is taken into account for the determining of whether the first differences and the second differences are mergeable.

15. The non-transitory computer-readable storage medium of claim 14, wherein the instructions further comprise:

assigning interconnected differences among the first differences to first groups of differences, respectively, and assigning interconnected differences among the second differences to second groups of differences, respectively;

determining group conflicts between the first groups and the second groups; and classifying differences of groups not involved in a group conflict of the group conflicts as mergeable and differences of groups involved in at least one group conflict of the group conflicts as not mergeable.

16. The non-transitory computer-readable storage medium of claim 15, wherein the instructions further comprise:

determining resolvable group conflicts among the determined group conflicts between the first groups and the second groups; and classifying the differences of groups with resolvable group conflicts as mergeable.

17. The non-transitory computer-readable storage medium of claim 15, wherein the instructions further comprise:

assigning at least three conflicting groups among the first groups and the second groups to a respective hypergroup, wherein the at least three groups are at least partly in conflict with each other;

determining resolvable group conflicts among the determined group conflicts of the respective hypergroup;

if all group conflicts of the respective hypergroup are resolvable group conflicts, classifying the differences of the respective hypergroup as mergeable.

18. The non-transitory computer-readable storage medium of claim 14, wherein the instructions further comprise:

classifying a first difference among the first differences and a second difference among the second differences as mergeable when the first difference and the second difference concern at least one mergeable property of at least one first information object, at least two independent properties of at least one second information object, two different information objects, or any combination thereof.

19. The non-transitory computer-readable storage medium of claim 14, wherein the information objects are at least partly organized in a graph structure, and wherein for the determining of whether the first differences and the second differences are mergeable, the graph structure of the information objects and the respective unique identifier of the information objects of the graph structure are taken into account, respectively.

* * * * *